(12) United States Patent
Kruger et al.

(10) Patent No.: US 10,770,744 B2
(45) Date of Patent: Sep. 8, 2020

(54) LITHIUM ION BATTERY MODULE WITH COOLING SYSTEM

(71) Applicant: TTB HOLDING COMPANY LIMITED, Surrey (CA)

(72) Inventors: Johannes Christian Kruger, Surrey (CA); Brent Anthony Perry, Surrey (CA)

(73) Assignee: Sterling PBES Energy Solution Ltd., Vancouver (CA)

( * ) Notice: Subject to any disclaimer, the term of this patent is extended or adjusted under 35 U.S.C. 154(b) by 57 days.

(21) Appl. No.: 15/551,690

(22) PCT Filed: Feb. 18, 2016

(86) PCT No.: PCT/CA2016/050149
§ 371 (c)(1),
(2) Date: Aug. 17, 2017

(87) PCT Pub. No.: WO2016/131141
PCT Pub. Date: Aug. 25, 2016

(65) Prior Publication Data
US 2018/0026296 A1    Jan. 25, 2018

Related U.S. Application Data

(60) Provisional application No. 62/117,686, filed on Feb. 18, 2015.

(51) Int. Cl.
*H01M 10/04* (2006.01)
*H01M 10/647* (2014.01)
(Continued)

(52) U.S. Cl.
CPC ..... *H01M 10/0481* (2013.01); *H01M 2/1016* (2013.01); *H01M 2/202* (2013.01);
(Continued)

(58) Field of Classification Search
None
See application file for complete search history.

(56) References Cited

U.S. PATENT DOCUMENTS

| 4,635,710 A | 1/1987 | Shelley |
| 5,344,723 A | 9/1994 | Bronoel et al. |

(Continued)

FOREIGN PATENT DOCUMENTS

| CN | 201936970 | 8/2011 |
| CN | 104409793 | 3/2015 |

(Continued)

*Primary Examiner* — Scott J. Chmielecki
(74) *Attorney, Agent, or Firm* — Roni M. Jones; Oyen Wiggs Green & Mutala LLP

(57) ABSTRACT

Apparatus, methods and systems are provided for cooling high power batteries. A plurality of carrier assemblies is stacked to form a cell stack. Each carrier assembly has a thermally conductive backing plate and a frame integrally formed therewith. A lithium-ion pouch cell (having a pair of cell tabs) is adhered to a front surface of the backing plate. Each cell tab is paired with a tab of opposite polarity of an adjacent battery cell. Thermally conductive compression bars are placed over the paired tabs to maintain electrical contact between the tabs. The compression bars also transfer heat to a cooling plate on top of the cell stack. Each carrier assembly incorporates a heat spreader sheet on a surface of the battery cell, a compressible foam sheet in front of the heat spreader sheet, and a thermally isolating sheet in front of the foam sheet.

46 Claims, 11 Drawing Sheets

(51) Int. Cl.
  *H01M 10/6568* (2014.01)
  *H01M 10/6554* (2014.01)
  *H01M 10/052* (2010.01)
  *H01M 2/10* (2006.01)
  *H01M 2/20* (2006.01)
  *H01M 10/6556* (2014.01)
  *H01M 10/6567* (2014.01)
  *H01M 10/613* (2014.01)
  *H01M 10/0585* (2010.01)

(52) U.S. Cl.
  CPC ....... *H01M 10/613* (2015.04); *H01M 10/647* (2015.04); *H01M 10/6554* (2015.04); *H01M 10/6556* (2015.04); *H01M 10/6567* (2015.04); *H01M 10/6568* (2015.04); *H01M 2/1077* (2013.01); *H01M 10/052* (2013.01); *H01M 10/0585* (2013.01)

(56) References Cited

U.S. PATENT DOCUMENTS

| | | | |
|---|---|---|---|
| 5,487,958 A | 1/1996 | Tura | |
| 6,709,783 B2 | 3/2004 | Ogata et al. | |
| 6,821,671 B2 | 11/2004 | Hinton et al. | |
| 7,297,438 B2 | 11/2007 | Kimoto | |
| 7,776,466 B2 | 8/2010 | Oh | |
| 8,057,933 B2 | 11/2011 | Miyahisa et al. | |
| 8,153,290 B2 | 4/2012 | Hermann et al. | |
| 8,197,958 B2 | 6/2012 | Gaben et al. | |
| 8,309,248 B2 | 11/2012 | Koetting et al. | |
| 8,343,650 B2 | 1/2013 | Raiser | |
| 8,349,478 B2 | 1/2013 | Timmons et al. | |
| 8,367,233 B2 | 2/2013 | Hermann et al. | |
| 8,404,375 B2 | 3/2013 | Gaben | |
| 8,557,416 B2 | 10/2013 | Mardall et al. | |
| 8,663,824 B1 | 3/2014 | Frey et al. | |
| 8,778,519 B1 | 7/2014 | Frey et al. | |
| 8,835,037 B2 | 9/2014 | Nguyen et al. | |
| 8,956,747 B2 | 2/2015 | Itoi et al. | |
| 8,968,906 B2 * | 3/2015 | Hsu | H01M 10/647 429/120 |
| 2009/0155679 A1 | 6/2009 | Zhu et al. | |
| 2010/0052692 A1 | 3/2010 | Yano et al. | |
| 2010/0266883 A1 | 10/2010 | Koetting et al. | |
| 2011/0256446 A1 | 10/2011 | Bronczyk et al. | |
| 2012/0009455 A1 | 1/2012 | Yoon | |
| 2012/0040221 A1 * | 2/2012 | Stoughton | H01M 10/647 429/120 |
| 2012/0100401 A1 | 4/2012 | Yasui et al. | |
| 2012/0171523 A1 | 7/2012 | Yang et al. | |
| 2012/0231318 A1 | 9/2012 | Buck et al. | |
| 2012/0328916 A1 | 12/2012 | Enning | |
| 2013/0040175 A1 * | 2/2013 | Yang | H01M 10/6555 429/83 |
| 2013/0045410 A1 * | 2/2013 | Yang | H01M 10/625 429/120 |
| 2013/0071717 A1 | 3/2013 | Muniz | |
| 2013/0071718 A1 * | 3/2013 | Cho | F28F 21/084 429/120 |
| 2013/0115506 A1 | 5/2013 | Wayne et al. | |
| 2013/0196211 A1 | 8/2013 | Park et al. | |
| 2013/0207459 A1 * | 8/2013 | Schroder | H01M 10/647 307/10.1 |
| 2013/0216887 A1 | 8/2013 | Wayne et al. | |
| 2013/0266838 A1 | 10/2013 | Von Borck et al. | |
| 2013/0330579 A1 | 12/2013 | Ejiri et al. | |
| 2014/0147709 A1 * | 5/2014 | Ketkar | F25B 1/00 429/50 |
| 2014/0162114 A1 * | 6/2014 | Suzuki | H01M 2/202 429/163 |
| 2014/0272513 A1 | 9/2014 | Sun et al. | |
| 2014/0335390 A1 * | 11/2014 | Hwang | F28F 1/00 429/72 |
| 2014/0349154 A1 | 11/2014 | Nguyen et al. | |
| 2015/0035370 A1 * | 2/2015 | Wyatt | H01M 2/206 307/77 |
| 2015/0111075 A1 * | 4/2015 | Yum | H01M 10/613 429/83 |
| 2015/0207187 A1 * | 7/2015 | Beltz | B23P 15/26 165/181 |
| 2016/0211497 A1 | 7/2016 | Motokawa et al. | |
| 2017/0331089 A1 | 11/2017 | Hashimoto et al. | |
| 2018/0034014 A1 | 2/2018 | Ichikawa et al. | |

FOREIGN PATENT DOCUMENTS

| | | |
|---|---|---|
| DE | 10 2011 053 439 A1 | 1/2013 |
| DE | 10 2013 021 651 A1 | 7/2014 |
| DE | 10 2013 213 909 | 1/2015 |
| JP | 07-326378 | 12/1995 |
| KR | 10-2011-0126764 | 11/2011 |
| KR | 10-2011-0126765 | 11/2011 |
| WO | 2013025608 | 2/2013 |
| WO | 2013/053386 | 4/2013 |
| WO | 2013/146562 | 10/2013 |
| WO | 2014/036227 A1 | 3/2014 |

\* cited by examiner

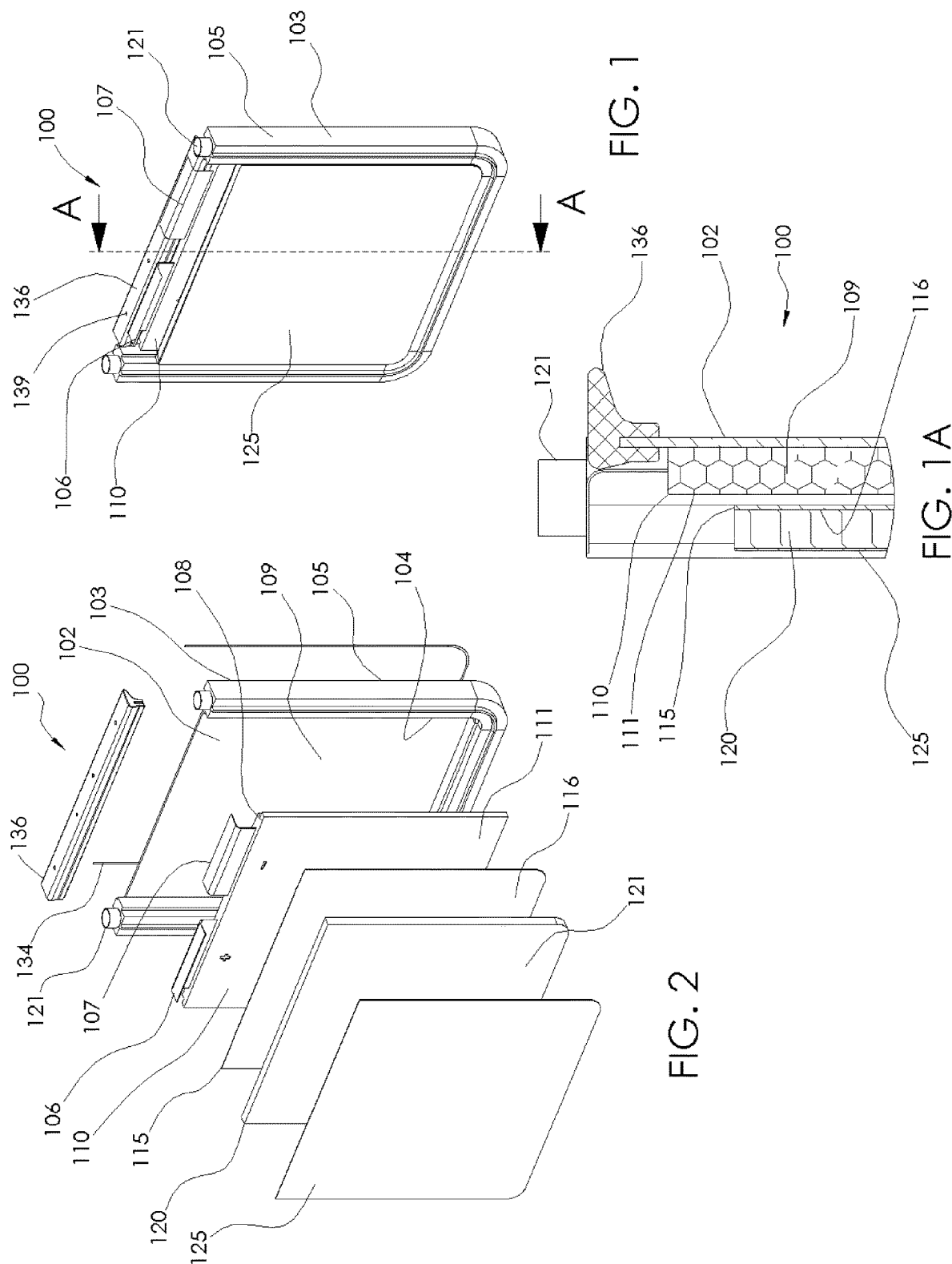

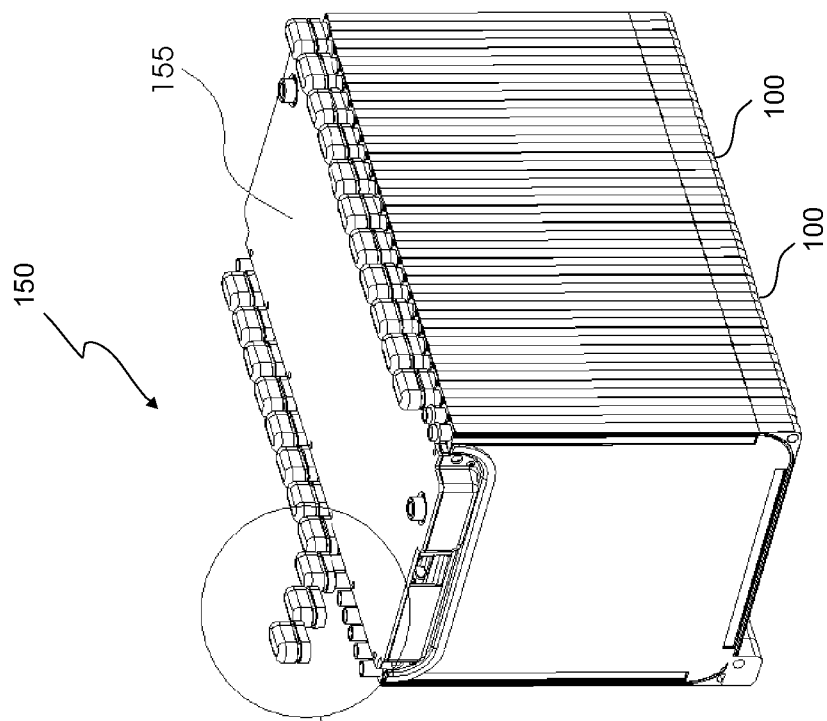
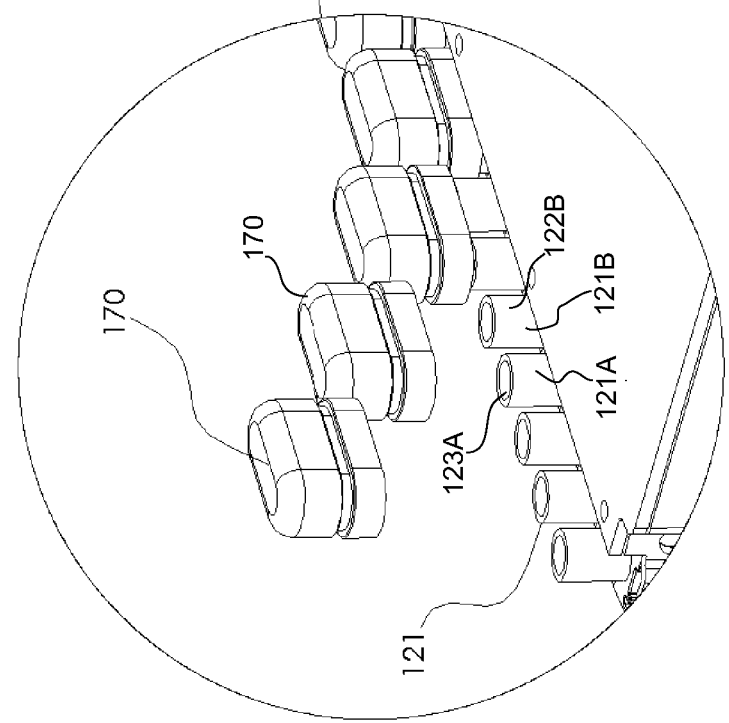
FIG. 8
FIG. 8A

LITHIUM ION BATTERY MODULE WITH COOLING SYSTEM

REFERENCE TO RELATED APPLICATIONS

This application claims priority from U.S. Application No. 62/117,686 filed on 18 Feb. 2015 and entitled LITHIUM ION BATTERY MODULE WITH COOLING SYSTEM. For purposes of the United States, this application claims the benefit under 35 U.S.C. § 119 of U.S. Application No. 62/117,686 filed on 18 Feb. 2015 and entitled LITHIUM ION BATTERY MODULE WITH COOLING SYSTEM which is hereby incorporated herein by reference for all purposes.

TECHNICAL FIELD

The technology described herein relates to high power batteries and apparatus, methods and systems for cooling such batteries.

BACKGROUND

There are generally two categories of battery applications: energy storage applications and power applications. For energy storage applications, the battery tends to be discharged quickly and charged back slowly, or vice versa. For such applications the battery capacity is such that the battery's RMS C-rate is typically less than 0.5 C. In many cases, the battery's RMS C-rate is less than 0.1 C. Example energy storage applications include uninterruptible power supply (UPS), and load leveling of solar power to accommodate for gaps between power demand and supply at different times of the day (e.g. day versus night).

In power applications, the battery needs to supply energy within a short time frame, and be quickly recharged to be ready for the next event. Power applications require less energy storage but more power to be delivered. For such applications the battery's RMS C-rate is generally above 0.5 C, and in some cases, approach 10 C. Example power applications include grid frequency regulation and grid stabilization.

As current flows through a battery cell, the cell's internal resistance produces heat. The flow of current I through a cell having a resistance R over a specified time t generates heat Q in accordance with Joule's first law:

$$Q = I^2 \cdot R \cdot t \qquad \text{Equation (1)}$$

wherein the heat Q produced is equal to the square of the current I multiplied by the resistance R of the cell and the time t. As can be seen from Equation (1), increasing the current I from 1 C to 4 C (as may be required for power applications, for example) will increase heat generation by a factor of 16 (i.e. $(4\ C)^2/(1\ C)^2$). Therefore, even for a moderate increase in current, it can become a challenge to remove the heat generated by a battery cell. If the cell overheats, thermal runaway can occur. If the cell is stacked in close proximity to other battery cells, then the thermal runaway in the cell can propagate to these other cells, which may result in a fire or explosion.

Because of the challenges in cooling a cell when increasing the current, manufacturers of large format batteries typically focus their efforts on the design of batteries for energy storage applications where the battery's RMS C-rate is relatively low as discussed above. However, when such batteries are used for power applications, large capacity battery modules are required to meet the power application demands. This leaves extra battery capacity that is not being used much of the time.

Battery cells come in different sizes and shapes, including cylindrical or flat. Due to its geometry, it is generally difficult to remove heat from a cylindrical cell, such as, for example, an 18650 cell (or the like) which is typically about 65 mm long and about 18 mm in diameter and has a capacity of 2 Ah. Instead of cylindrical cells, flat cells are often preferred for high power battery applications, since flat surfaces can be cooled more efficiently. Flat cells include, for example, prismatic cells, layered cells, pouch cells and the like.

Some efforts have been made to address the cooling of multi-cell battery power systems. Methods of cooling battery cells include, for example, passive radiation, air cooling and liquid cooling. For battery power systems incorporating flat cells, methods of cooling include:

- Placing the pouch cells in a cell carrier which holds the pouch cells by their edges, and providing cooling passages to cool the edges, as described for example in US Patent Application Publication No. 2013/0266838. This design relies on the thermal conductivity of the battery cell itself to distribute heat to the edges. This may not be effective in cooling the battery cell in high power battery applications since the thermal conductivity of the battery cell is low.
- Placing the pouch cells in a plastic cell carrier and placing a heat conductive sheet over each pouch cell to move heat to an outside edge of the plastic cell carrier, as described for example in U.S. Pat. No. 8,835,037. The heat conductive sheet is thin (typically less than 1 mm thick) and thermal conductivity of the heat conductive sheet is typically anisotropic or directionally dependent (for example, a graphite sheet has very high in-plane conductivity but very low through-plane conductivity). Due to these limitations, the battery cell may not be sufficiently cooled in high power applications, and thermal runaway may occur, damaging the plastic cell carrier and the cell.
- Placing the pouch cells in an aluminum casted structure that has small liquid-containing channels close to the flat surface of the cells, as described for example in U.S. Pat. No. 8,404,375. This design is subject to various drawbacks: the small liquid channels may not provide for reliable flow; the channels are prone to leaks of the liquid coolant due to the thinness of the channel walls; and the apparatus is complex and therefore difficult and costly to manufacture.

There is a general desire for apparatus, systems and methods that address and/or ameliorate at least some of the aforementioned problems and otherwise assist with cooling a high power battery cell, module and/or system.

The foregoing examples of the related art and limitations related thereto are intended to be illustrative and not exclusive. Other limitations of the related art will become apparent to those of skill in the art upon a reading of the specification and a study of the drawings.

SUMMARY

Aspects of the technology provide a battery module having a plurality of battery cell carrier assemblies stacked on top of one another to form a cell stack. Each carrier assembly includes a thermally conductive backing plate and a frame integrally formed therewith. The frame extends along at least a portion of a perimeter of the backing plate.

The frame comprises a channel extending through the frame for receiving a liquid coolant. The liquid coolant-receiving channel may be provided by way of a pipe extending through the frame. The pipe may be made of stainless steel, copper, aluminum and/or the like. The frame and backing plate may be made of aluminum or other suitable thermally conductive material. The frame may extend adjacent to the first side edge, the bottom edge and the second side edge of the backing plate.

Each carrier assembly includes a battery cell (e.g. such as a lithium-ion pouch cell) disposed on a front surface of the backing plate. The battery cell has a positive current collector tab and a negative current collector tab extending from the battery cell. In particular embodiments the collector tabs extend from an upper edge of the battery cell. The carrier assemblies in a cell stack may be stacked with alternating polarities so that positive and negative current collector tabs are reversed with respect to those of an adjacent carrier assembly. Apart from the current collector tabs having the most positive and most negative terminals in the cell stack, each one of the current collector tabs is paired with and connected to a current collector tab of opposite polarity in a battery cell of an adjacent carrier assembly. The battery module incorporates a plurality of compression bars. A compression bar is placed over a corresponding pair of connected current collector tabs. The compression bar helps to maintain electrical contact between the paired tabs and remove heat from the current collectors.

In certain embodiments, each carrier assembly has a compressible foam sheet disposed in front of the battery cell. In some embodiments, each carrier assembly also has a heat spreader sheet disposed between the battery cell and the foam sheet. The heat spreader sheet may be a flexible graphite sheet. The heat spreader sheet extends to and contacts the frame.

In particular embodiments, each carrier assembly incorporates a thermally isolating sheet disposed in front of the foam sheet. The thermally isolating sheet may be a ceramic sheet. The ceramic sheet acts as a heat barrier between adjacent carrier assemblies, and can help to contain a thermal runaway event to one battery cell carrier assembly.

The battery module may have a plurality of electrically isolating bars. Each electrically isolating bar is adapted to support a pair of connected current collector tabs, wherein the connected current collector tabs are folded over the electrically isolating bar. In particular embodiments, the compression bars are placed over the folded current collector tabs. The compression bars may be made of a thermally conductive material, such as copper. The battery module may include an upper cooling plate placed over the compression bars. The cooling plate is disposed perpendicularly to the cell stack and extends between front and rear ends of the cell stack. At least one thermal gap pad is disposed underneath the cooling plate for compressing the compression bars and transferring heat from the compression bars to the cooling plate.

In some embodiments, each carrier assembly has a tongue extending from one side of the carrier assembly and a groove defined in the opposite side of the carrier assembly. To form the cell stack, the tongue of one carrier assembly is inserted into the corresponding groove of an adjacent carrier assembly.

Other aspects of the technology provide for a method of manufacturing a battery cell carrier assembly. The method includes: integrally forming a base structure having a thermally conductive backing plate and a frame comprising a liquid coolant-receiving channel, the frame extending along at least a portion of a perimeter of the backing plate; placing a battery cell (such as a lithium-ion pouch cell) on a front surface of the backing plate; adhering a heat spreader sheet to a front surface of the battery cell; and adhering a compressible foam sheet to a front surface of the heat spreader. The heat spreader sheet may comprise a flexible graphite sheet. The method may further include placing a thermally isolating sheet in front of the compressible foam sheet. In particular embodiments, the method may include insert-casting a pipe into the frame. The pipe may be made of stainless steel and/or copper, and the frame and backing plate may be made of aluminum.

Further aspects of the technology provide for a method of manufacturing a battery module. The method includes: stacking, on top of one another so as to form a cell stack, a plurality of battery cell carrier assemblies manufactured according to the methods described herein or having the features described herein; and, placing a cooling plate on top of the cell stack, the cooling plate extending between front and rear ends of the cell stack. The carrier assemblies may be stacked with alternating polarities so that positive and negative current collector tabs are reversed with respect to those of an adjacent battery cell carrier assembly. For the carrier assemblies that do not contain the most positive terminal in the cell stack, a negative current collector tab of the carrier assembly is folded with a positive current collector tab of an adjacent carrier assembly over an electrically isolating bar to form a folded tab pair. A compression bar is placed over each of the folded tab pairs for compressing and maintaining electrical contact between the positive and negative current collector tabs in each of the folded tab pairs. The compression bars are made of thermally conductive material. At least one thermal gap pad is placed underneath the cooling plate and against the compression bars so as to transfer heat from the compression bars to the cooling plate.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 1 illustrates an assembled battery cell carrier assembly according to one embodiment. FIG. 1A illustrates a partial cross-sectional view of this battery cell carrier assembly, taken along line A-A in FIG. 1.

FIG. 2 is an exploded view of the FIG. 1 battery cell carrier assembly.

FIG. 5A is a detail view showing a compression bar to be placed over a folded cell tab pair.

FIG. 6A is a top plan view of the battery module of FIG. 6. FIG. 6B is a partial cross-sectional view taken along line B-B in FIG. 6A.

FIG. 8 illustrates a battery module according to one embodiment. FIG. 8A is a detail view of the connections between pipes of adjacent battery cell carrier assemblies in the battery module of FIG. 8.

DESCRIPTION

Figures 3, 3A:
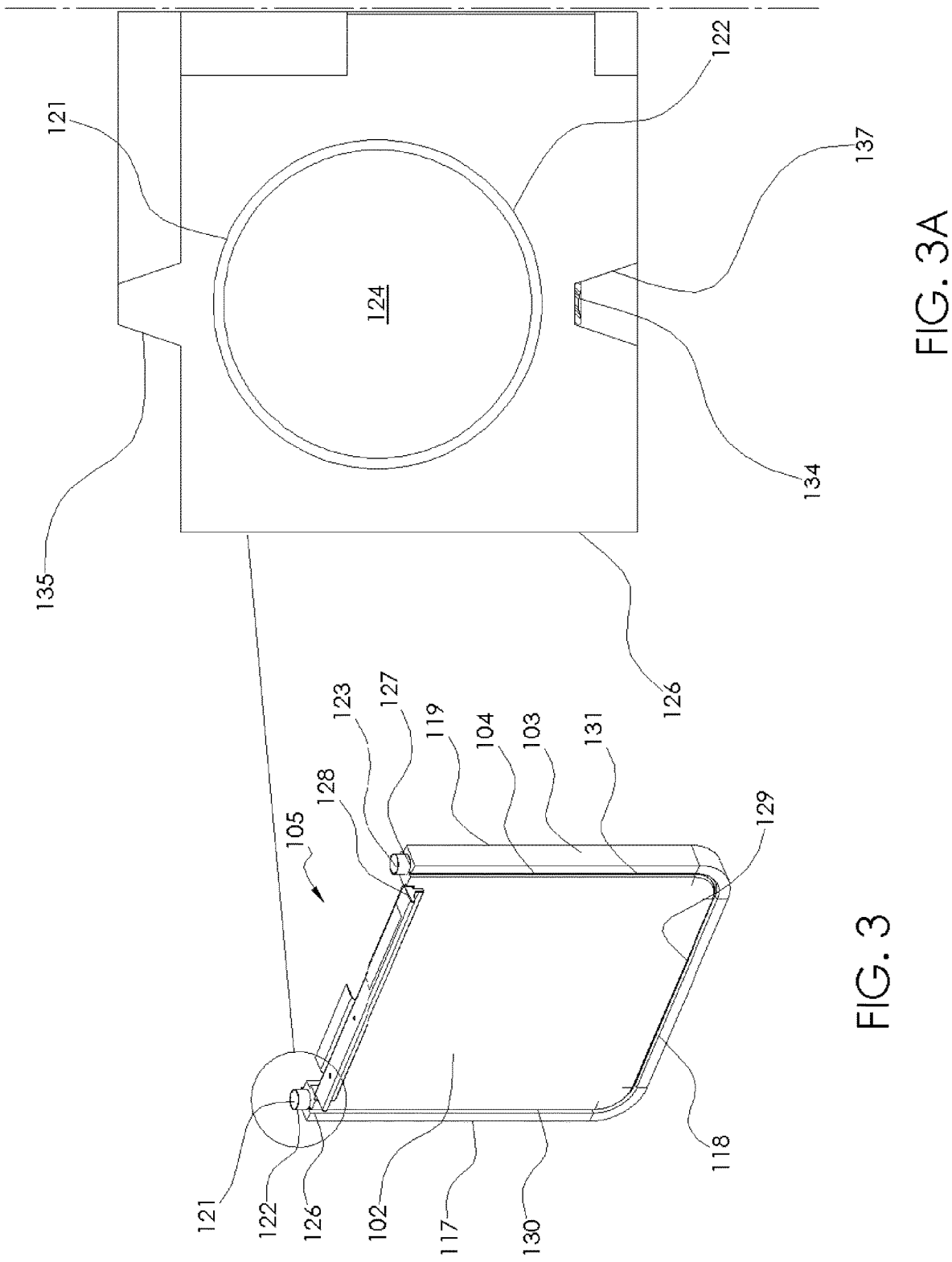
FIG. 3 illustrates a base structure of the FIG. 1 battery cell carrier assembly.
FIG. 3A is an enlarged top plan view of a terminal end of the base structure showing the frame and pipe.

Throughout the following description, specific details are set forth to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 1 shows one fully assembled battery cell carrier assembly 100 in accordance with a particular embodiment. A partial cross-sectional view of assembly 100 is shown in FIG. 1A. An exploded view of assembly 100, showing more clearly all of its various components, is illustrated in FIG. 2. Assembly 100 comprises a flat battery cell 110 and a cell carrier for holding the battery cell 110 (shown in FIG. 2). A plurality of assemblies 100 can be stacked on top of one another (arranged parallel to one another) to make up a cell stack for a battery module.

As best seen in the exploded view of FIG. 2, battery cell carrier assembly 100 comprises a plurality of layered components. The plurality of components making up battery cell carrier assembly 100, excluding the battery cell 110, is also collectively referred to herein as a "cell carrier" for the battery cell 110. In the illustrated embodiment the cell carrier's first layer is a base structure 105 at the rear or back of assembly 100 and the cell carrier's last layer is a thermally insulating outer layer 125 at the front of assembly 100. A plurality of other layers is disposed between the base structure 105 and thermally insulating outer layer 125.

Base structure 105 comprises a thermally conductive, rigid or semi-rigid backing plate 102 and a frame 103 extending around at least a portion of the periphery 104 of backing plate 102. Base structure 105 provides support and rigidity for battery cell 110. Base structure 105 also functions as a heat conductor to assist in cooling cell 110. In particular embodiments backing plate 102 and frame 103 are integrally formed. As explained in more detail below, the integral formation of base structure 105 may provide for more effective heat transfer away from (or toward) battery cell 110. Base structure 105 may be made of aluminum, copper and/or another suitable metal or other material with good thermal conductivity. In the illustrated embodiment, each base structure 105 supports a single battery cell 110 (i.e. there is one cell 110 disposed on each backing plate 102).

For safety reasons, a thin electrically isolating layer (not shown in FIG. 2) may be disposed on front surface 109 of backing plate 102. The electrically isolating layer may be, for example, a polyimide film, such as a Kapton® tape which is in the order of 25 μm in thickness, however, other suitable electrically isolating materials may be used as a thin film or coating on backing plate 102. A battery cell 110 is placed over the front surface 109 of backing plate 102, on top of the electrically isolating layer, so that the battery cell is electrically isolated from the backing plate. In particular embodiments, cell 110 is secured to backing plate 102 by way of compression provided by a compressible foam sheet 120 placed over heat spreader 115 and cell 110 (as described in further detail below). Alternately, or in addition to the compressible foam sheet, a thermally conductive adhesive may be used to adhere cell 110 to backing plate 102.

In certain embodiments, cell 110 does not extend all the way out to frame 103 of base structure 105. Keeping the edges of cell 110 away from frame 103 protects the cell 110 against mechanical shocks that would damage the edges of cell 110. Edge impact may result in short circuits in internal layers of cell 110 that may lead to thermal runaway.

In the illustrated embodiment, cell 110 has a first tab 106 serving as a positive current collector and a second tab 107 serving as a negative current collector. Cell 110 may be a lithium ion (Li-Ion) pouch cell. Cell 110 may comprise, for example, a XALT® 75 Ah High Power (HP) lithium ion cell. However, other suitable lithium-ion cells, pouch cells and/or flat cells may be used. Apart from tabs 106, 107 which extend from an upper edge 108 of cell 110, pouch cells are typically enclosed in a flexible aluminum bag. Pouch cells are typically flat, and are therefore generally space efficient. In alternate embodiments, other types of flat battery cells 110 may be contained in battery cell carrier assembly 100, such as, for example, flat cells enclosed in metal cases. Flat battery cells can be generally cooled more efficiently than cylindrical battery cells due to the flat cell's larger surface area.

As the next layer, a heat spreader 115 is disposed on a front surface 111 of cell 110 (see FIGS. 1A, 2). Heat spreader 115 is formed of a suitable material to help distribute heat from cell 110 to cooler surfaces. For example, in some embodiments, heat spreader 115 is a graphite sheet. The graphite sheet may be flexible. In other embodiments, heat spreader 115 is aluminum or copper foil, or the like, or it can be made of any other suitable material for distributing heat. Using a flexible heat spreader 115 allows for some expansion and contraction due to temperature changes in cell 110, and accommodates for changes in the thickness of cell 110 over time (typically, cell 110 will thicken as it ages). Heat spreader 115 assists in distributing heat from cell 110 outward toward the edges of assembly 100 (as the battery is generally cooler away from the cell or toward its outer edges, due to the coolant-containing pipe 121 extending through frame 103). In some embodiments, heat spreader 115 extends all the way to frame 103 of base structure 105. This allows heat spreader 115 to help carry heat out toward pipe 121 in frame 103 so that the heat can be removed by liquid coolant flowing in pipe 121. Heat spreader 115 may be adhered to cell 110 using a suitable contact adhesive. Heat spreader 115 may also be adhered to portions of frame 103 using the contact adhesive.

Next, as seen in FIGS. 1A and 2, a compressible foam sheet 120 is placed over front surface 116 of heat spreader 115. Contact adhesive may be used to adhere compressible foam sheet 120 to heat spreader 115. Once a plurality of cell carrier assemblies 100 has been assembled and stacked to form a battery module 150, the foam sheet 120 in each cell carrier assembly 100 helps to compress other cell carrier assembly layers (e.g. such as heat spreader 115 and cell 110) together and/or to backing plate 102. Foam sheet 120 helps to ensure that the layers of assembly 100 are held together even as cell 110 expands and contracts during operation of the battery. The compression provided by foam sheet 120 assists in adhering battery cell 110 to backing plate 102. Such foam sheet 120 may replace the need to use thermally conductive adhesive to bond battery cell 110 to backing plate 102, although in some embodiments, strips of adhesive tape (placed, for example, at the corners of cell 110) may be used to temporarily adhere the cell 110 to backing plate 102 during assembly. In other embodiments, other suitable compressible materials may be used in place of the compressible foam sheet 120 to compress the other layers while still allowing for some expansion of cell 110.

Finally, a thermally insulating outer layer 125 is placed over front surface 121 of foam sheet 120. In particular embodiments, outer layer 125 is a ceramic sheet. In alternate embodiments, other suitable heat insulation materials may be used for outer layer 125. Outer layer 125 acts as a thermal barrier and limits heat transmission between adjacent battery cells 110 or battery cell carrier assemblies 100. Outer layer 125 helps to prevent thermal runaway in one cell from propagating to the adjacent battery cells 110. Outer layer 125 therefore protects against thermal runaway propagation, reducing incidents of fire or explosion which could be caused by such an event. Outer layer 125 may be adhered to foam sheet 120 using a suitable contact adhesive.

The cooling aspects of base structure 105 are described in more detail below with reference to FIG. 3. Base structure 105 comprises a backing plate 102 and a frame 103. Backing plate 102 has a rectangular shape, defined by a periphery 104 comprising opposed upper and lower edges 128, 129 and opposed first and second side edges 130, 131 (extending between upper and lower edges 128, 129). In the illustrated embodiment, frame 103 has three contiguous portions extending along three respective sides of backing plate 102 to form a general U-shaped or C-shaped bar. Specifically, frame 103 comprises a first side portion 117 extending along first side edge 130 of backing plate 102; a middle portion 118 continuing perpendicularly to first side portion 117 and extending between side edges 130, 131 and along lower edge 129 of backing plate 102; and a second side portion 119 parallel to first side portion 117 and extending along second side edge 131 of backing plate 102. Frame 103 extends between a first terminal end 126 located at the upper end of first side portion 117 and a second terminal end 127 located at the upper end of second side portion 119.

A liquid coolant-receiving channel extends continuously through all three portions 117, 118, 119 of frame 103. In the illustrated embodiments the liquid-coolant receiving channel is provided by way of a pipe 121. Pipe 121 extends through frame 103, between an inlet 122 and an outlet 123 located at terminal ends 126, 127, respectively of frame 103. Pipe 121 has a channel or bore 124 therethrough (see FIG. 3A) for carrying liquid coolant through frame 103 alongside backing plate 102's edges 129, 130 and 131. As the cell 110 produces heat, the liquid coolant in pipe 121 assists in carrying heat away from backing plate 102 (from the three sides) and also away from frame 103. However, if the battery is placed in a cold environment, then the liquid coolant in pipe 121 can be heated, if necessary, to deliver heat to backing plate 102 and frame 103 in order to maintain the battery within a desired operating temperature range. The liquid coolant may be water, a water-based coolant or any other liquid suitable for travelling through pipe 121 and removing heat from (or bringing heat to) backing plate 102 and frame 103.

The temperature of the liquid coolant may be controlled to maintain the battery at a constant temperature that is beneficial for the particular battery chemistry used. In particular embodiments, for example, the liquid coolant temperature and/or the liquid coolant flow rate is regulated so that the temperature of the battery is maintained within an acceptable range. In some embodiments the acceptable range for the battery temperature is 10° C. to 15° C. In other embodiments the acceptable range is 10° C. to 20° C. Other temperature ranges may be preferable for still other embodiments (e.g. other temperature ranges may be preferable for other types of battery cells or battery chemistry used). Depending on the ambient temperature, it may be necessary to adjust the temperature of the liquid coolant upward or downward to bring the battery temperature to within the acceptable range. In particular embodiments the temperature of the liquid coolant is not regulated. For example, cold or unheated tap water may be circulated through the pipes 121 in a battery module 150. The water may be circulated through the pipes 121 at a configurable flow rate (such as 1 GPM or 0.003785 m$^3$/min).

In particular embodiments, inlets, outlets 122, 123 of adjacent battery cell carrier assemblies 100 are connected in series. Outlet 123 of a first battery cell carrier assembly 100 is connected to the inlet 122 of a second, adjacent battery cell carrier assembly 100, and so on, so that the same liquid coolant circulates through the frame 103 of each battery cell carrier assembly 100 in turn. In other embodiments, outlets 122, 123 connect to inlet and outlet manifolds, respectively. FIGS. 8, 8A show an exemplary battery module 150 in which series connections between pipes 121 of adjacent battery cell carrier assemblies 100 are formed by way of caps 170 placed over the adjacent inlets and outlets. As shown in FIG. 8A, one cap 170 is placed to cap outlet 123A of one pipe 121A and an inlet 122B of an adjacent pipe 121B. Cap 170 facilities liquid connection between pipes 121A, 121B. In particular, liquid coolant leaving outlet 123A of the first pipe 121A flows through a passageway in cap 170 and into inlet 122B of the second pipe 121B.

In particular embodiments, frame 103 is integrally formed with backing plate 102. The integral formation of the base structure 105 decreases heat resistance to cold surfaces (as there is no gap between backing plate 102 and frame 103), and allows for the efficient removal of heat (i.e. heat is moved out toward the three sides of backing plate 102 where it is then removed through liquid cooling provided by frame 103). Frame 103 may be made of one or more thermally conductive materials such as aluminum, copper or the like or any other suitable material that can be cast, molded and/or otherwise formed to provide for a frame containing a pipe 121 or other liquid coolant-receiving channel. Backing plate 102, which is integrally formed with frame 103, may be made of the same material as frame 103. In some embodiments, pipe 121 is made of stainless steel, copper and/or other suitable material for forming a pipe. While it is not necessary that pipe 121 be constructed of stainless steel or copper, one advantage of using such material is that it is less prone to galvanic corrosion than other materials such as aluminum. However, since such material is generally costlier and heavier than aluminum, in particular embodiments, the frame 103 and the backing plate 102 may be made of aluminum while pipe 121 is made of stainless steel or copper. In some embodiments, a stainless steel pipe having a diameter of 12 mm and a wall thickness of 0.6 mm is used for pipe 121. A pipe diameter in the range of 8 mm to 15 mm (or 10 mm to 20 mm in other embodiments) provides robustness to the frame structure and reduces the chance of clogged pipes and provides more effective cooling, as compared to smaller pipe diameters. Using a pipe with a wall thickness of less than 1 mm (such as 0.6 mm in one example embodiment) facilitates heat transfer between the base structure material and the coolant flowing through the pipe.

According to some embodiments, a method of manufacturing base structure 105 includes using high pressure dye casting techniques to force molten metal (such as aluminum) into a mold having the shape of base structure 105, with the result that backing plate 102 and frame 103 are provided in one integrally formed piece. Pipe 121 can be made by bending a pipe (e.g. such as a stainless steel pipe or a copper pipe as described above) to the desired C-shape or U-shape, and insert-casting pipe 121 into the base structure 105. This can be done, for example, by placing the bent pipe 121 into the mold, clamping the pipe down to hold it in position, and using high pressure dye casting to force the molten metal into the mold. Once the material is cooled, the formed base structure 105 is taken out of the mold. This technique of manufacturing the base structure 105 embeds and intimately bonds pipe 121 to the base structure 105, and results in an integrally formed base structure 105 with no gap between the backing plate 102 and the frame 103. In one example embodiment, the mold is configured so that the formed base structure 105 has a backing plate 102 with dimensions of 270 mm×280 mm and a frame 103 which has a width of 19 mm. In the frame 103 is embedded the pipe 121, for example, a stainless steel pipe having a 12 mm diameter and a wall thickness of 0.6 mm. The backing plate 102, frame 103 and pipe 121 may have different dimensions in other embodiments.

A battery cell carrier assembly 100 having the components as described herein assists in drawing the heat produced in battery cell 110 out toward backing plate 102 as well as toward the outer edges of the battery cell carrier assembly (i.e. toward frame 103), where it can be further drawn away by the liquid coolant travelling through a coolant-receiving channel in frame 103 (such as a pipe 121 as seen in FIG. 2, for example). In the illustrated embodiment, pipe 121 extends around the three edges 129, 130 and 131 of backing plate 102 and therefore provides cooling from three sides of the cell carrier. Once the battery cell carrier assembly 100 is assembled with other carrier assemblies 100 into a battery module 150, mechanisms are also provided to draw heat away from the upper edge 128 of each backing plate 102. These mechanisms may include, for example, a cooling plate placed over the cell stack for drawing heat away from the current collectors on the upper edge of the battery cell, as described below.

Figure 5:
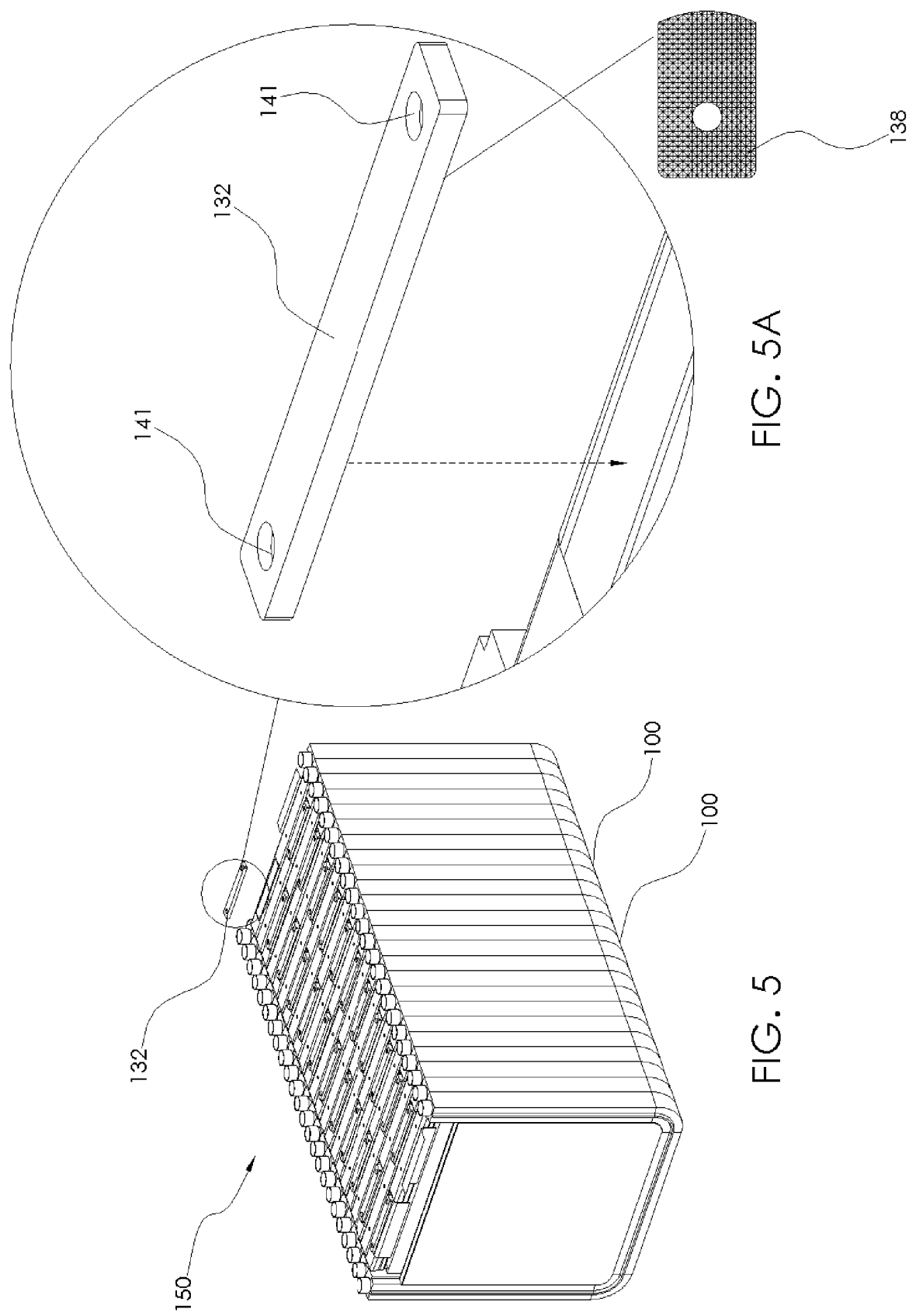
FIG. 5 illustrates a plurality of battery cell carrier assemblies stacked together to form a battery module.
Figure 6:
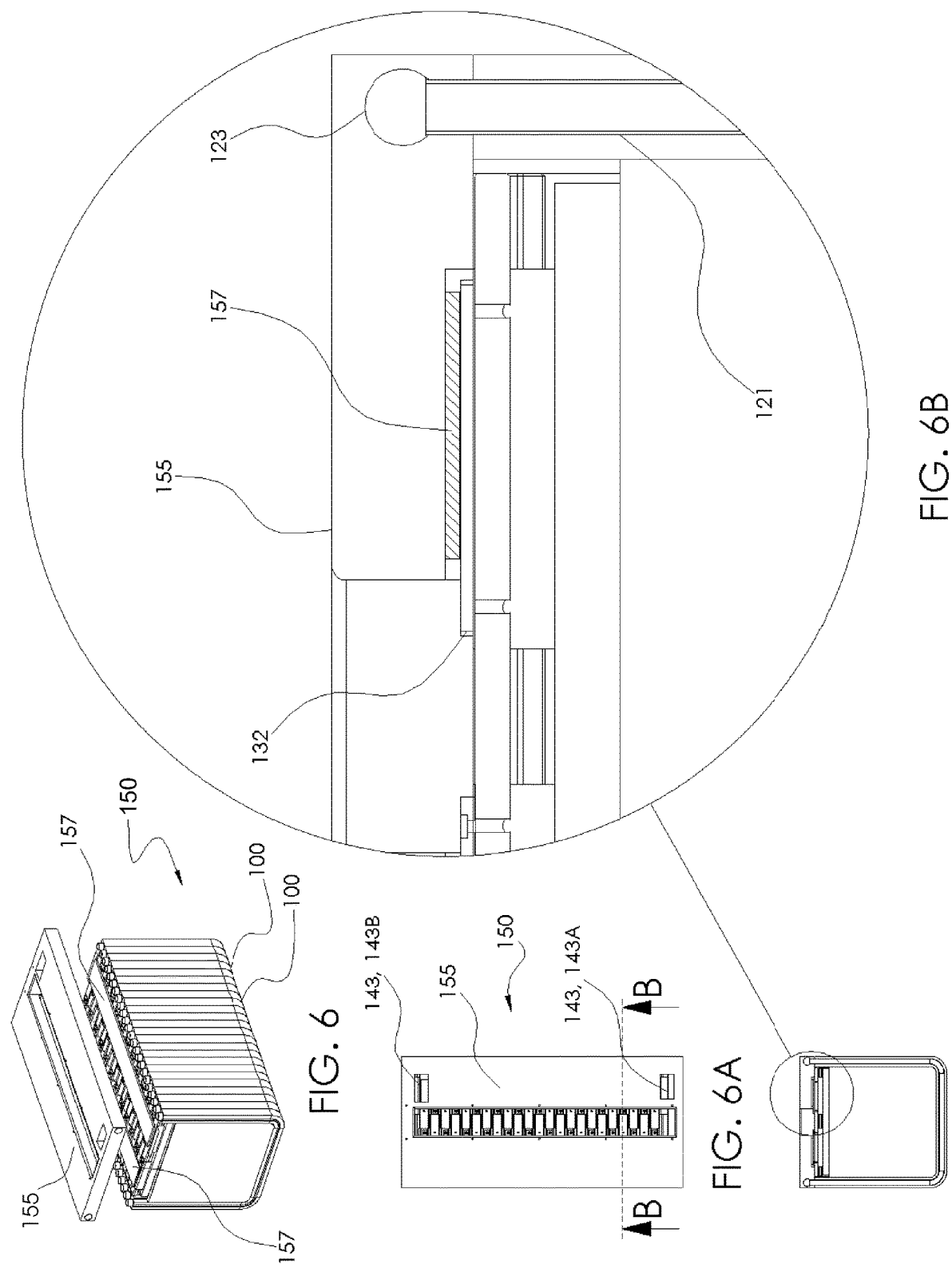
FIG. 6 illustrates a battery module according to one embodiment incorporating an upper cooling plate and thermal gap pad.

Once the battery cell carrier assemblies 100 (each holding a battery cell 110) have been assembled as shown and described above, they can be stacked one on top of the other (arranged parallel to one another) to form a cell stack for a battery module 150 (shown in FIGS. 5 and 6). Each battery cell carrier assembly 100 may include interlocking features in order to facilitate the stacking of the carrier assemblies. Such interlocking features may enable the carrier assemblies 100 to be stacked together without requiring any external enclosures to hold together the cell stack. For example, features for providing a tongue and groove connection between adjacent battery cell carrier assemblies 100 may be incorporated into the frame 103 of each base structure 105. In the illustrated embodiment, as best seen in FIGS. 3 and 3A, frame 103 has a protrusion or tongue 135 extending from one side of the frame (e.g. the front side of the frame 103 as seen in the illustrated embodiment). On the other side of the frame (e.g. the back side of the frame 103 as seen in the illustrated embodiment), frame 103 has a complementary groove 137. FIG. 3 shows the back side of a cell carrier assembly 100 in which the groove 137 is located at the interface between the backing plate 102 and the frame 103. Tongue 135 and groove 137 may extend continuously along the full length of frame 103 between the frame's terminal ends 126, 127, as shown in the illustrated embodiment. However, this is not necessary, and in other embodiments tongue 135 and groove 137 may extend only along a partial length of frame 103, or they may be provided in discrete segments at spaced apart locations on frame 103. Battery cell carrier assemblies 100 are arranged into a stack by inserting the tongue 135 of a base structure 105 of one battery cell carrier assembly 100 into a complementary groove 137 of a base structure 105 of an adjacent battery cell carrier assembly 100. In the illustrated embodiment, an O-ring or gasket 134 is seated in the groove 137 to help form a seal between the adjacent battery cell carrier assemblies 100 at the tongue and groove connection.

It is not necessary that the inter-carrier connection comprises a tongue and groove connection as shown in the illustrated embodiment. In other embodiments, frame 103 may incorporate other types of tongue and groove connections, or other complementary or interlocking features to enable assemblies 100 to be stacked together. These may include: pin and socket-type connections between adjacent assemblies 100; protrusions on the side of one assembly 100 (e.g. on the frame 103) and corresponding recesses on one side of an adjacent assembly 100 (e.g. on the frame 103); or locating rods through adjacent frames 103 tying the cell stack together; and the like.

Figure 7:
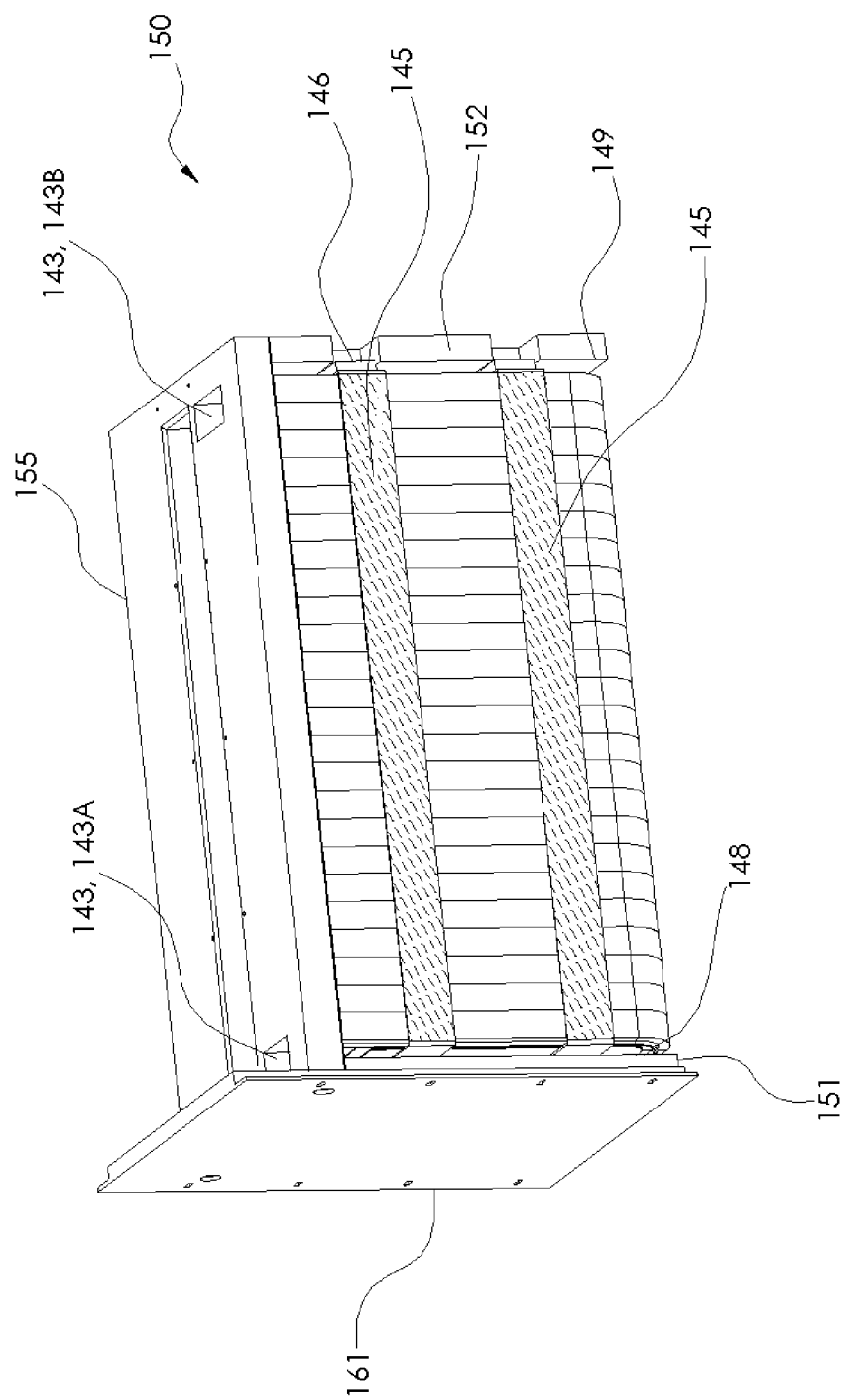
FIG. 7 illustrates a battery module according to one embodiment incorporating an upper cooling plate and end plates.

Once the desired number of battery cell carrier assemblies has been stacked together to form the cell stack, the cell stack may be secured by straps, ties, rods or other means. Such means can help to compress each tongue into a corresponding groove of an adjacent cell carrier assembly. For example, FIG. 7 shows a battery module 150 incorporating a pair of straps 145 extending between the front end 148 and rear end 149 of the module. Straps 145 have tensioning means 146 for tightening the straps to produce the desired compression. In addition, strap tensioning means 146 may be adapted to accommodate for expansion and contraction of the cell stack, as a result of changes in heat and/or material creep over time. Electrically isolated end caps 151, 152 are provided to cap the battery module's front end 148 and rear end 149 respectively. End caps 151, 152 may also be secured to the cell stack using straps 145. In other embodiments, rods may be used in place of straps 145. The rods may extend through holes in the end caps 151, 152 or other structure in the battery module 150 and may be bolted down to compress the cell stack.

For each of the assembled battery cell carrier assemblies 100, frame 103 extends around three sides of backing plate 102 (side edges 130, 131 and lower edge 129). In particular embodiments, the fourth, upper edge 128 of backing plate 102 is made available for forming the required electrical connections between the battery cells. A method for stacking the battery cell carrier assemblies 100 and connecting the battery cells 110 is described below with reference to FIG.

4. In particular embodiments, cooling may also be provided at the fourth edge 128 of backing plate 102 and at the current collectors at tabs 106, 107 (as described below).

Figure 4:
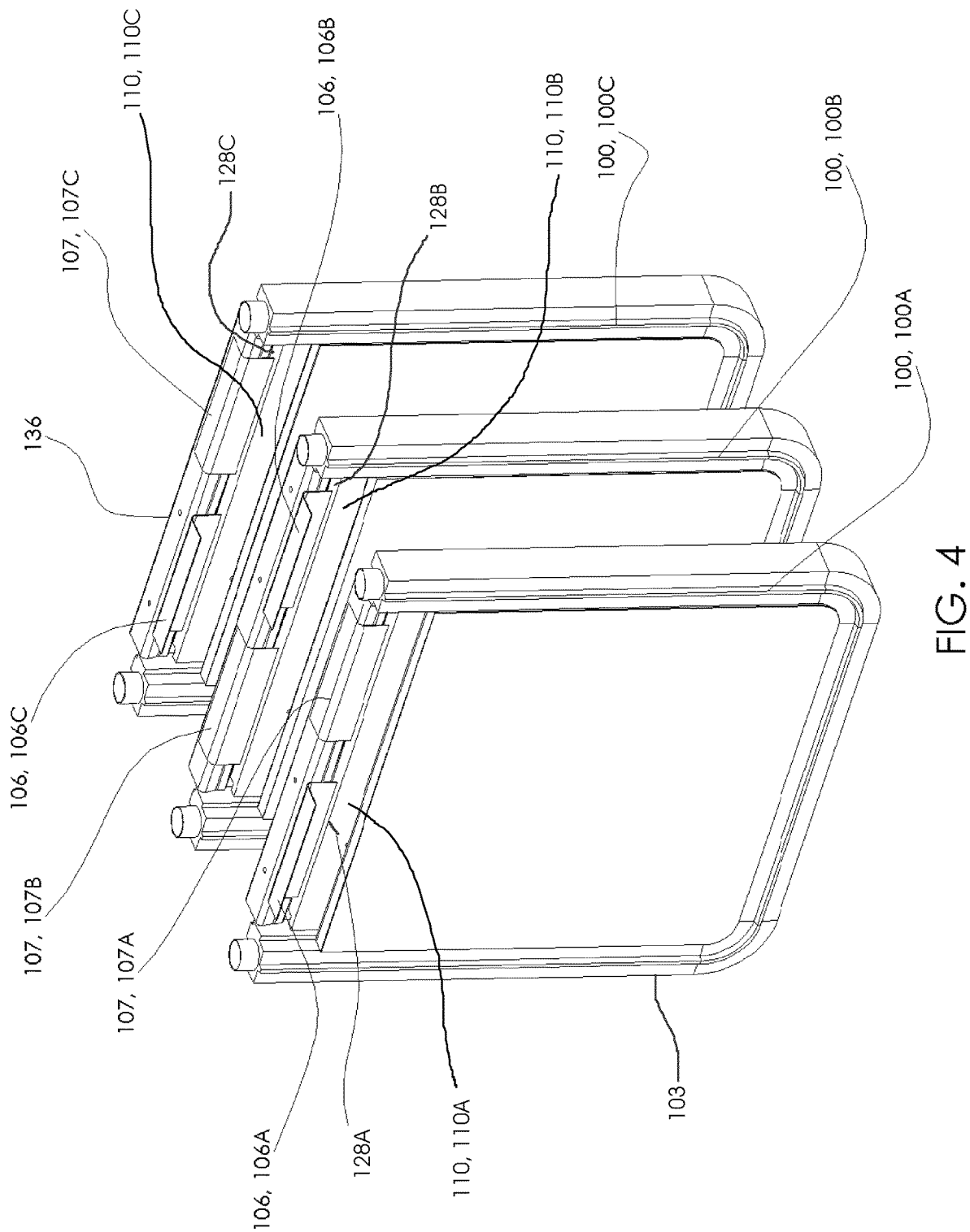
FIG. 4 illustrates three of the battery cell carrier assemblies of FIG. 1 arranged to be stacked together, and shown spaced apart from each other to more clearly show the alignment of the cell tabs.

By way of example, three adjacent battery cells 110A, 110B, 110C, shown in FIG. 4, can be arranged and connected in series as follows. First, battery cell carrier assemblies 100A, 100B, 100C respectively carrying battery cells 110A, 110B, 110C are stacked in alternating fashion, with positive and negative terminals reversed with respect to an adjacent cell. For example, as seen in FIG. 4, negative terminal tab 107A of first battery cell 110A is aligned with positive terminal tab 106B of second battery cell 110B, and negative terminal tab 107B of second battery cell 110B is aligned with positive terminal tab 106C of third battery cell 110C (and so forth if there are more than three carrier assemblies in the cell stack). The tabs 106, 107 (i.e. the current collectors) are metal foil tabs. Each tab is folded with another tab over an electrically isolating bar 136. In particular, negative terminal tab 107A of the first battery cell 110A is folded, along with positive terminal tab 106B of the second battery cell 110B, over a first electrically isolating bar 136 placed on top of upper edges 128A, 128B of cells 110A, 110B. Similarly, negative terminal tab 107B of second battery cell 110B is folded, along with positive terminal tab 106C of third battery cell 110C, over a second electrically isolating bar 136 placed on top of upper edges 128B, 128C of cells 110B, 110C. This results in two pairs of folded connected tabs: (1) tab 107A of cell 110A with tab 106B of cell 110B, and (2) tab 107B of cell 110B with tab 106C of cell 110C. For each pair of folded tabs, one tab is folded over the other tab, and both of the folded tabs are folded over a bar 136 (shown in FIGS. 1 and 1A). Assuming that electrical contact is made between the tabs in each of the folded tab pairs, battery cells 110A, 110B, 110C are connected in series through this arrangement. To hold the tabs in their folded position, fasteners 139 (such as screws, bolts, rivets or the like) (see FIG. 1) may be inserted through the folded tab pairs and bar 136. In other embodiments, clamps or other mechanisms may be used to secure the folded tab pairs. Electrically isolating bars 136 may be made of plastic or some other suitably electrically isolating material.

To maintain good electrical contact between the tabs within a pair of folded tabs, a compression bar 132 (see FIG. 5) may be placed over each pair of folded tabs to compress the tabs together. Compression bar 132 may have approximately the same dimensions as the upper surface of the pair of folded tabs. For example, compression bar may be 20 mm wide and 80 mm long in particular embodiments. One or more fasteners (such as screws, bolts, rivets or the like) may be inserted through corresponding holes 141 in each bar 132 to maintain compression on the folded tabs so that they remain in good electrical contact. In addition, compression bar 132 may be knurled on the underside 138 (i.e. on the side contacting the pair of folded tabs) so as to help to deform the material of the folded tabs and improve the electrical contact between the tabs.

Compression bar 132 may be made of any material suitable for applying compression to the pair of folded tabs. In particular embodiments copper is used for compression bar 132. The high thermal conductivity of copper allows compression bar 132 to draw heat away from the pair of folded tabs. Thus, by providing thermally conductive compression bars, cooling can also be provided for the current collectors and at the fourth, upper edge 128A, 128B, 128C of each battery cell 110. Heat can be drawn away from the compression bars 132 by way of a cooling plate (described in more detail below with reference to FIG. 6).

While only three battery cells 110A, 110B, 110C are shown in FIG. 4, this is for illustrative purposes only, and it is to be understood that any number of battery cells may be arranged and connected together in series using the methods described above to form a cell stack. For example, using the techniques described herein, a total of 24 battery cell carrier assemblies 100 can be stacked and connected in series to provide a cell stack for a battery module 150 as seen in FIGS. 5 to 9. If the lithium ion pouch cells 110 have a voltage of between 3.2 to 4.2 VDC, then a battery module 150, containing 24 of such cells connected in series, has a voltage range of between 77 to 100 VDC.

To create a battery bank for high power applications, a plurality of battery modules 150 may be connected together in series to form a string. In particular embodiments, a string can have between 2 and 10 modules. Thus the voltage range of a string is between 154 to 200 VDC and 770 to 1000 VDC. In some embodiments up to 30 modules are connected in series to form a string. The strings can be connected in parallel to form the bank. The bank energy can vary from a few kWh to several MWh.

As seen in FIGS. 6, 6A and 6B, a cooling plate 155 is incorporated into battery module 150. Cooling plate 155 is placed on top of the cell stack, so as to remove heat from the top of the battery cell carrier assemblies 100 (including at the cell tabs). Cooling plate 155 is placed over the compression bars 132 that are compressing the folded cell tab pairs (which are described above with reference to FIG. 4). Thus, cooling plate 155 draws heat away from compression bars 132 (and hence, away from the current collector tabs 106, 107). Cooling plate 155 may be made of aluminum, copper or any other suitable material with high thermal conductivity. Cooling plate 155 may be cooled by pipes containing liquid coolant (similarly to frame 103 of base structure 105) or by other means such as Peltier heat pumps, heat pipes or the like. Also, cooling plate 155 may incorporate pipes, tubes, manifolds, nozzles and the like for handling the connections between the coolant-containing pipes 121 of the battery cell carrier assemblies 100.

A pair of conformable, thermally conductive gap pads 157 (FIG. 6) is positioned between compression bars 132 and cooling plate 155 to help transfer heat between the compression bars 132 and the cooling plate 155. Cooling plate 155 may be connected to the cell stack in a manner that allows for compression of the gap pads 157 (e.g. screws, bolts, or other fasteners may be used to secure cooling plate 155 to the cell stack and press down on the gap pad 157). An electrically isolated cap (not shown) may be placed over the cooling plate 155 and power cables to protect against electrical exposure. A metal front plate 161 may be secured at the front end 148 of battery module 155 over the electrically isolated end cap 151 in order to protect the module's plastic parts.

As seen in FIG. 6, apertures or gaps 143A, 143B (collectively, apertures 143) are defined in the cooling plate 155 over the most positive and negative terminals of the cell stack to allow for electrical power connections to outside of the module. The power connections can be connected to connectors at the front end 148 of the module by means of a power cable, flexible bus bar, or the like.

It can be appreciated that the apparatus, systems and methods in accordance with the embodiments described herein provide a number of advantages. For example:

Cooling is provided both for the individual battery cell and the battery module as a whole. For example, at the battery cell level, cooling is provided through features of the cell carrier. Battery cell carrier assembly 100 includes a backing structure 105 (comprising backing plate 102 and frame 103) and heat spreader 115, all of which assist in drawing heat away from cell 110 to the outside edges and outer flat surfaces of the battery cell carrier assembly 100. By using a liquid coolant in the pipe 121 that extends through frame 103, cooling is provided around three sides of cell 110. In addition, the current collectors or terminals at the upper edge of cell 110 are cooled by way of thermally conductive compression bars 132 placed over the folded tab pairs. Additional cooling for the battery module and cells is provided by way of the module's upper cooling plate 155, which is placed over the cell stack (i.e. on top of the compression bars). One or more thermal gap pads 157 are positioned between the cooling plate 155 and the current collectors 106, 107 to help transfer heat from the current collectors and the compression bars to cooling plate 155. In this manner, cooling is provided around all sides of each cell 110, including at the current collectors.

The thermally insulating outer layer 125 of battery cell carrier assembly 100 acts as a thermal barrier to contain thermal runaway to one cell and prevent the heat from moving to adjacent cells. This feature, along with the cell cooling features that reduce the heat of a battery cell, help to protect against thermal runaway propagation within the module.

Ease of assembly and reduction of parts are achieved by: incorporating cooling into the battery cell carrier itself (i.e. by way of the features of battery cell carrier assembly 100 described herein); using tongue and groove connections (or other similar connections) between adjacent battery cell carrier assemblies to eliminate the need for a separate enclosure to hold together a cell stack; and connecting adjacent battery cells in series by way of folded tab pairs, folded over an electrically isolating bar.

The cooling abilities of a battery module 150 incorporating battery cell carrier assemblies 100 as described herein have been evaluated by testing conducted by the applicant. Testing was conducted on a 6.5 kWh battery module 150 in accordance with the invention, comprising 24 battery cell carrier assemblies 100, each assembly 100 holding one battery cell 110 comprising a XALT® 75 Ah High Power (HP) lithium-ion cell. The test comprised inducing an internal short circuit in a sacrificial battery cell within the battery module 150, and further overcharging the sacrificial cell in order to attempt to cause a thermal runaway in the cell. The battery module 150 was prepared for the test by discharging the module to a lower voltage limit of approximately 3.4 V. A single cell 110 within the module 150, referred to herein as the "sacrificial" or "overcharged" cell, was independently charged to its upper voltage limit of 4.2V. Thus, the voltage of the module 150 at the start of the test was approximately 82 V. The module 150 was instrumented with additional voltage and temperature sensors on the overcharged sacrificial cell and adjacent cells. The module 150 was placed in a system rack and connected to cooling supply and charging power supplies. The rack was also instrumented with temperature, pressure and flow sensors. Since the objective of the test was to evaluate the cooling abilities of the battery module 150 independent of special control systems, any additional safety functionality provided by way of such hardware and/or software was disabled for the test.

During the test, the module 150 was charged at a charging current of 1C and cooled with unheated tap water flowing at 1 GPM (0.003785 m³/min) through the pipes 121 in the cooling frames 103 of the cell carrier assemblies 100. Charging was continued until the non-sacrificial cells reached their upper voltage limit of 4.2V. At the conclusion of the charging phase, the module 150 was left idle to observe the voltage and temperature behaviour of the sacrificial cell. The module 150 was then discharged at the post-test discharge rate of 1C until all the cells were below the discharge end voltage of 3.6 V. The module 150 was then disconnected and removed from the rack, and disassembled to observe the state of the sacrificial cell and other cells of interest in the module 150.

As a result of such testing, it was confirmed by the voltage and temperature profile of the sacrificial cell that such cell had experienced an internal cell failure resulting from the internal short circuit. In addition, the sacrificial cell bag had become compromised as evidenced by a visible tear in the pouch which was observed upon completion of the test. However, despite the failure of the sacrificial cell, the temperature of the sacrificial cell was contained under 42° C. for its entire charge period.

Figure 9:
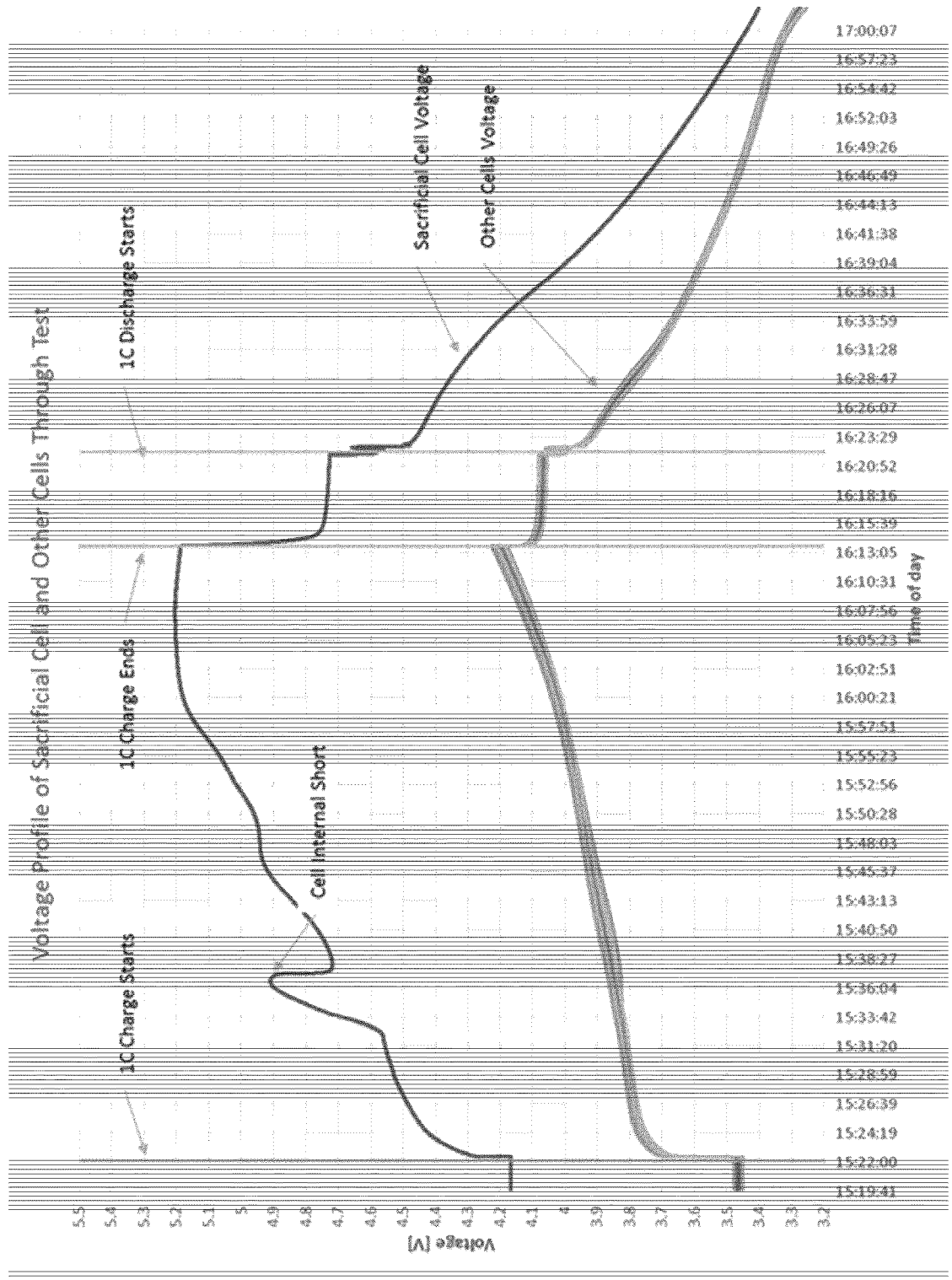
FIG. 9 is a graph of the voltage profile of a sacrificial cell and other cells in a battery module according to an embodiment of the invention during an internal cell failure test.

FIG. 9 illustrates the voltage profile of the sacrificial cell and the non-sacrificial cells over the entire test. As seen in FIG. 9, the sacrificial cell is overcharged during the entire test while the other cells are charged from near 0% SOC (State of Charge) to near 100% SOC.

Figure 10:
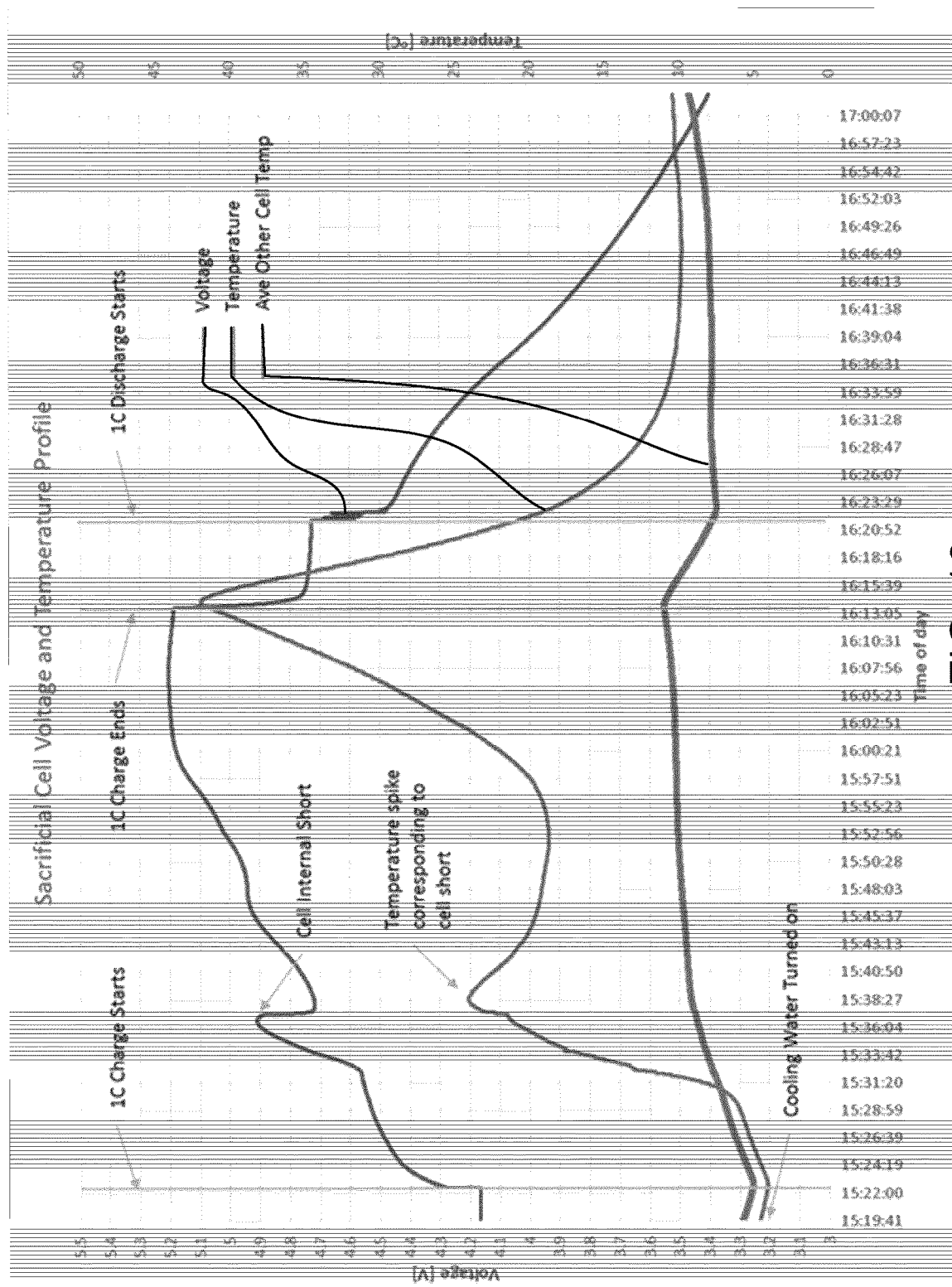
FIG. 10 is a graph of the voltage and temperature profiles of a sacrificial cell in a battery module according to an embodiment of the invention during an internal cell failure test. The profile for the average temperature of the non-sacrificial cells is also shown in the graph.

FIG. 10 illustrates the voltage and temperature recorded for the sacrificial cell during the course of the 1C charge cycle. A sudden drop in cell voltage and corresponding temperature spikes are evidence of the cell's internal short circuit. It can be seen from FIG. 10 that even despite the internal short circuit the sacrificial cell temperature did not exceed approximately 42° C. during the test, and does not have the same profile of a rapid, continuous rise as would have been the case had thermal runaway occurred. The sacrificial cell temperature also drops once the charging is finished. In addition, FIG. 10 shows that the profile of the average of the non-sacrificial cell temperatures is quite stable through the charge cycle.

Figure 11:
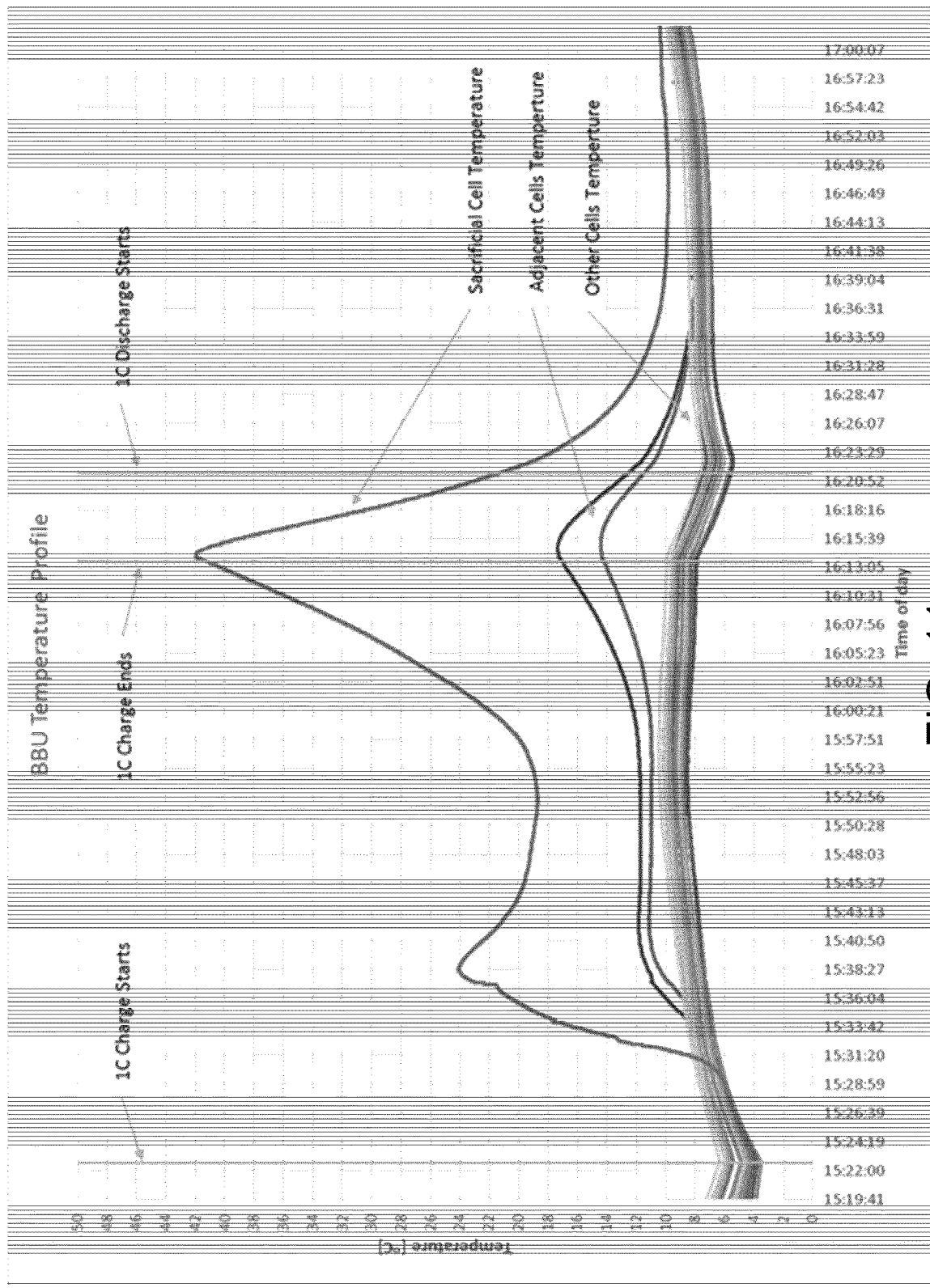
FIG. 11 is a graph of the temperature profile of a sacrificial cell, adjacent cells and other cells in a battery module according to an embodiment of the invention during an internal cell failure test.

FIG. 11 illustrates the temperature profile of the sacrificial cell, adjacent cells and other cells in the module during the charge cycle. As seen in FIG. 11, the temperatures of the other cells in the module appear to have been largely unaffected by the higher temperature of the sacrificial cell. The cells adjacent to the sacrificial cell became hotter than the remaining cells, but still remained significantly cooler than the sacrificial cell at all times. For example, during the test the temperatures were recorded and it was found that when the temperature of the sacrificial cell had risen by its maximum value of 37.7° C., one adjacent cell (on one side of the sacrificial cell) had a recorded temperature rise of 13.2° C. while the other one of the adjacent cells (on the other side of the sacrificial cell) had a recorded temperature rise of 10.4° C. The average recorded temperature rise of all remaining cells (that were not adjacent to the sacrificial cell) was 3.7° C.

Figure 12:
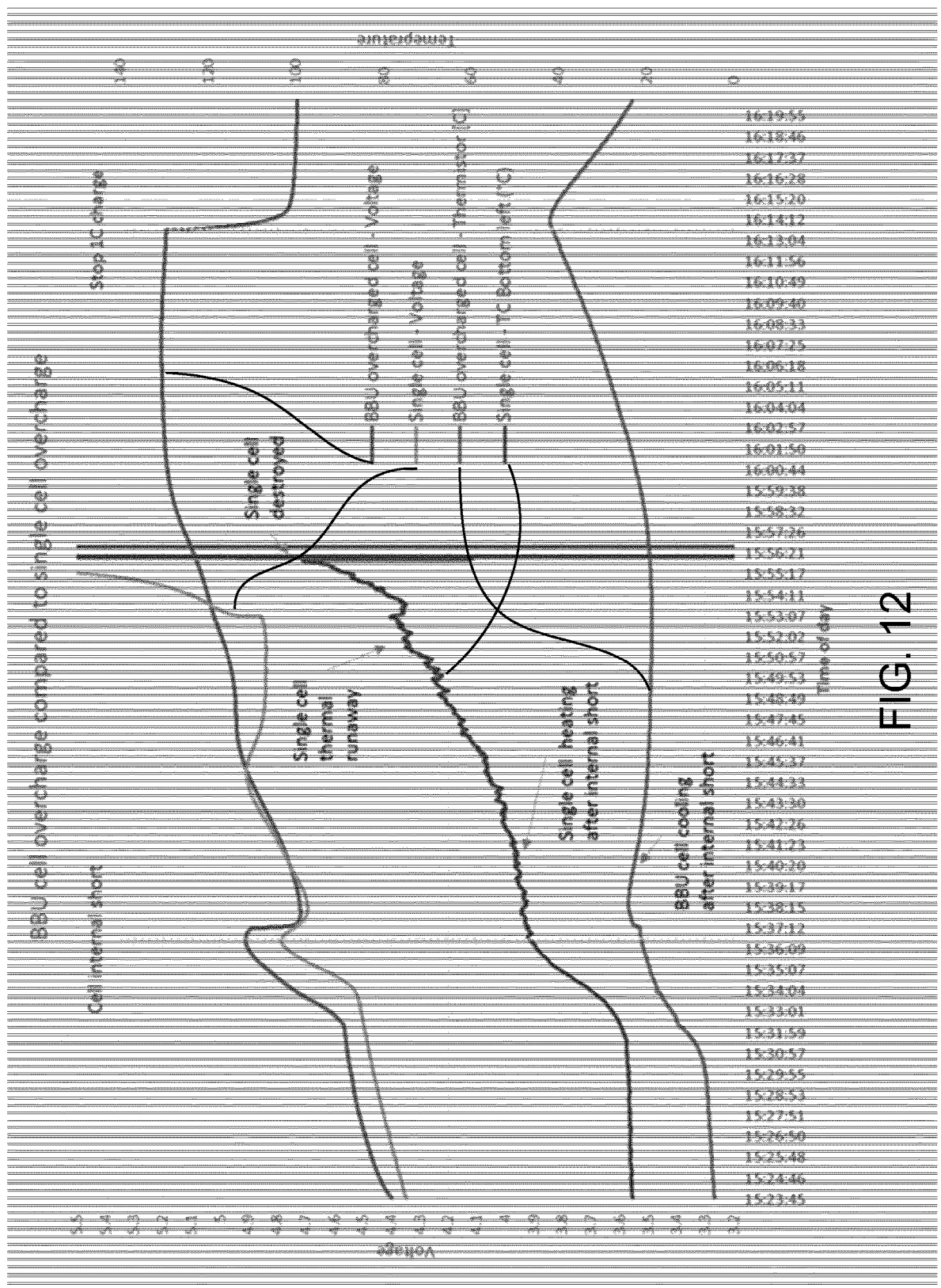
FIG. 12 is a graph of the voltage and temperature profile of a free-standing battery cell during an internal cell failure test.

Reference tests were run on a single free-standing battery cell of the same make and model as those used in the aforementioned testing on battery module 150 (i.e. a XALT® 75 Ah High Power (HP) lithium-ion cell). This standalone cell was not contained in any cell carrier. The cell was placed on a metal plate for the duration of the test. To prepare for the test, the cell was charged to the same starting voltage of 4.2 V as the sacrificial cell in battery module 150. Next, a 1C charge was applied to the cell for up to one hour. FIG. 12 shows a graph of the voltage and temperature profiles of this cell. Also included in the graph for reference is the voltage and temperature profiles of the sacrificial cell within battery module 150 during the aforementioned tests conducted on battery module 150. The data has been aligned in order to enable a comparison in the behaviour of each cell after the significant internal short circuit, in the free-standing cell (outside of battery module 150) and sacrificial cell within the battery module 150. As can be seen from FIG. 12, the temperature of the free-standing cell experiences thermal runaway after the internal short circuit. Its temperature continues to rise rapidly until the cell is destroyed by fire. By contrast, the sacrificial cell in the battery module 150 is contained (and even reduced) after experiencing the significant internal short circuit. Its temperature increases slowly over the course of the charge, but remains constrained and immediately begins to drop once the charging is stopped. As the sacrificial cell is discharged at 1 C from the overcharged state, the temperature of the sacrificial cell drops toward normal operating temperature.

Thus, these tests demonstrated that despite an internal cell failure of a sacrificial cell within the battery module 150 that was caused by overcharging of the sacrificial cell (resulting in a significant internal short circuit), thermal runway did not occur in the sacrificial cell or in any of the other cells. The temperature of the overcharged cell and adjacent cells were constrained and the average temperatures of the remaining cells was not substantially impacted by the overcharged cell. The failure of the overcharged cell did not result in failure or damage in the other cells of the battery module 150.

Where a component (e.g. cell, pouch cell, battery module, current collector, tab, terminal, backing plate, carrier, pipe, frame, heat spreader, isolating bar, compression bar, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

While a number of exemplary aspects and embodiments have been discussed above, those of skill in the art will recognize certain modifications, permutations, additions and sub-combinations thereof. For example:

- It is not necessary that battery cells 110 are arranged and connected together in series in the manner described above with reference to FIG. 4. Battery cells 110 may be connected together using other techniques that would result in a series connection between the cells. In other embodiments, various subsets of the cells 110 within a battery module may be connected in parallel and/or in series.
- It is not necessary that the liquid connections between pipes 121 of adjacent battery cell carrier assemblies 100 be series connections as shown and described with reference to FIGS. 8, 8A. In other embodiments, liquid connections can be made between the battery cell carrier assemblies 100 in any combination of parallel and series connections.
- The gasket 134 providing a seal between adjacent battery cell carrier assemblies 100 can be placed in a separate groove outside the locating groove 137.
- While it is described above that a liquid coolant in pipe 121 is used to carry heat away from frame 103 and backing plate 102, it will be appreciated by one of skill in the art that other cooling means may be used to cool the battery cell. For example, in addition to or instead of the above-described liquid coolant-based cooling methods, other means may be used, including non-liquid coolant based cooling means, such as for example, Peltier coolers, heat pumps, fins for air cooling, or the like, and/or other means.
- In alternate embodiments, battery cells 110 can be stacked together in the same orientation as described above with reference to FIG. 4, but electrically connected via bus bars between the positive and negative tabs 106, 107.
- In alternate embodiments, positive and negative tabs 106, 107 of adjacent battery cells 110 can be welded together instead of using compression bars 132 as described above.
- The battery module's top cooling plate 155 can be cooled with Peltier coolers, heat pumps, or fins for air cooling.
- The metal front plate 161 of a battery module can be used to secure the module to the rack carrying a string of battery modules.
- In certain embodiments, liquid coolant-receiving pipe 121 itself provides the frame structure (or at least a portion of the frame structure) for the cell carrier.
- Current collector tabs 106, 107 do not need to extend from an upper edge 108 of battery cell 110 as shown in the illustrated embodiment. In alternate embodiments, the current collector tabs 106, 107 may extend from a different edge of the battery cell 110 such as the lower and/or side edges. They may both extend from one edge of the battery cell 110, or they may extend from different edges of the battery cell 110. For example, one current collector tab 106 may extend from an upper edge of the battery cell 110 and the other current collector tab 107 may extend from the opposing, lower edge of battery cell 110. Frame 103 (containing the liquid coolant-receiving channel) may be shaped to accommodate the current collector tabs 106, 107. For example the frame 103 may have one or more flat sections where the current collector tabs are located and/or the frame 103 may bend around the current collector tabs.
- In alternate embodiments the frame 103 may extend around all sides of the backing plate 102 so that the liquid coolant-receiving channel in the frame 103 circulates around a periphery of the backing plate 102 and the battery cell. In such embodiments the frame 103 may be shaped to accommodate the current collector tabs 106, 107 extending from the cell, such as by having one or more flat sections where the current collector tabs are located and/or by bending around the current collector tabs. Alternately, the frame 103 may not wrap completely around the backing plate 102 and may have a gap where the current collector tabs are located. For example, the frame 103 may be generally C-shaped, and may have its opposing terminal ends located toward a centre of the upper edge of the backing plate. A space is therefore provided between the terminal ends of the frame 103 to accommodate the current collector tabs. The remainder of the frame 103 wraps around the side and bottom edges of the backing plate 102.
- While a rectangular battery cell is shown in the illustrated embodiments, it is not necessary that the battery cell have this shape. A cell carrier according to the embodiments described herein may be used in connection with any size or shape of battery cell, which may be disposed on backing plate 102 of the cell carrier assembly 100. Flat battery cells are typically preferable since they have the advantage that the cell carrier may be more effective in cooling such cells, given the cells' larger surface area.

It is therefore intended that the scope of the following appended claims and claims hereafter introduced should not be limited by the embodiments set forth in the examples, but should be given the broadest interpretation consistent with the description as a whole.

What is claimed is:

1. A battery module comprising:
a plurality of carrier assemblies stacked on top of one another to form a cell stack, each carrier assembly comprising:
a thermally conductive backing plate extending between opposing first and second side edges and opposing top and bottom edges;
a frame integrally formed with the thermally conductive backing plate and extending from one or more of the first and second side edges and the top and bottom edges, the frame comprising a liquid coolant-receiving channel extending around at least a portion of a perimeter of the backing plate, the perimeter defined by the first and second side edges and the top and bottom edges; and
a battery cell disposed on a front surface of the backing plate, and comprising a compressible foam sheet disposed in front of the battery cell, the battery cell having a positive current collector tab and a negative current collector tab extending from the battery cell, wherein, apart from each endmost current collector tab in the cell stack, each one of the current collector tabs is paired with and connected to a current collector tab of opposite polarity in a battery cell of an adjacent carrier assembly; and
a plurality of compression bars, each compression bar placed over a corresponding pair of connected current collector tabs and adapted to maintain electrical contact between the paired tabs and remove heat therefrom.

2. The battery module according to claim 1 wherein in each carrier assembly, the battery cell is attached to a front surface of the backing plate by way of compression provided by the compressible foam sheet.

3. The battery module according to claim 1 wherein each carrier assembly comprises a heat spreader sheet disposed between the battery cell and the foam sheet.

4. The battery module according to claim 3 wherein in each carrier assembly, the heat spreader sheet comprises a flexible graphite sheet.

5. The battery module according to claim 3 wherein in each carrier assembly, the heat spreader sheet extends to and contacts the frame.

6. The battery module according to claim 1 wherein in each carrier assembly, the liquid coolant-receiving channel extends adjacent to the first side edge, the bottom edge and the second side edge of the backing plate.

7. The battery module according to claim 1 wherein in each carrier assembly, the frame comprises a pipe and a bore of the pipe provides the liquid coolant-receiving channel.

8. The battery module according to claim 7 wherein in each carrier assembly, the pipe is formed of stainless steel and/or copper.

9. The battery module according to claim 1 wherein in each carrier assembly, the backing plate comprises an aluminum plate.

10. The battery module according to claim 1 wherein each carrier assembly comprises a thermally isolating sheet disposed in front of the foam sheet.

11. The battery module according to claim 10 wherein in each carrier assembly, the thermally isolating sheet comprises a ceramic sheet.

12. The battery module according to claim 1 comprising a plurality of electrically isolating bars, each electrically isolating bar adapted to support a pair of connected current collector tabs, wherein the connected current collector tabs are folded over the electrically isolating bar.

13. The battery module according to claim 1 wherein the compression bars are made of a thermally conductive material.

14. The battery module according to claim 13 wherein the compression bars are made of copper.

15. The battery module according to claim 1 comprising an upper cooling plate placed over the compression bars, the cooling plate disposed perpendicularly to the cell stack and extending between front and rear ends of the cell stack.

16. The battery module according to claim 15 comprising at least one thermal gap pad disposed underneath the cooling plate for compressing the compression bars and transferring heat from the compression bars to the cooling plate.

17. The battery module according to claim 1 wherein the carrier assemblies are stacked with alternating polarities so that positive and negative current collector tabs are reversed with respect to those of an adjacent carrier assembly.

18. The battery module according to claim 1 wherein in each carrier assembly, the battery cell comprises a flat battery cell.

19. The battery module according to claim 18 wherein in each carrier assembly, the battery cell comprises a lithium-ion pouch cell.

20. The battery module according to claim 1 wherein each carrier assembly comprises a tongue extending from one side of the carrier assembly and a groove defined in the opposite side of the carrier assembly, wherein to form the cell stack, the tongue of one carrier assembly is inserted into the corresponding groove of an adjacent carrier assembly.

21. The battery module according to claim 1 wherein the cell stack comprises 24 carrier assemblies.

22. A battery bank comprising at least two battery modules according to claim 1, wherein the battery modules are connected together in series.

23. The battery bank according to claim 22 comprising between two and 30 battery modules.

24. A method of manufacturing a battery cell carrier assembly, comprising:
integrally forming a base structure having a thermally conductive backing plate and a frame, the frame comprising a liquid coolant-receiving channel extending around at least a portion of a perimeter of the backing plate;
placing a battery cell on a front surface of the backing plate;
adhering a heat spreader sheet to a front surface of the battery cell; and
adhering a compressible foam sheet to a front surface of the heat spreader.

25. The method according to claim 24 wherein the backing plate comprises opposing first and second side edges and opposing top and bottom edges, the method comprising forming the liquid coolant-receiving channel such that the channel extends adjacent to the first side edge, the bottom edge and the second side edge of the backing plate.

26. The method according to claim 24 wherein the heat spreader sheet comprises a flexible graphite sheet.

27. The method according to claim 24 comprising insert casting a pipe into the frame, wherein a bore of the pipe provides the liquid coolant-receiving channel.

28. The method according to claim 27 wherein the pipe is stainless steel and/or copper, and the frame and backing plate are aluminum.

29. The method according to claim 24 comprising adhering a thermally isolating sheet to a front surface of the compressible foam sheet.

30. The method according to claim 24 wherein the battery cell is a lithium-ion pouch cell.

31. A method of manufacturing a battery module comprising:
  stacking, on top of one another so as to form a cell stack, a plurality of battery cell carrier assemblies manufactured according to claim 24; and
  placing a cooling plate on top of the cell stack, the cooling plate extending between front and rear ends of the cell stack.

32. The method according to claim 31 wherein stacking the plurality of carrier assemblies comprises stacking the carrier assemblies with alternating polarities so that positive and negative current collector tabs are reversed with respect to those of an adjacent battery cell carrier assembly.

33. The method according to claim 32 comprising, for each carrier assembly apart from the one that contains the most positive terminal in the cell stack, folding a negative current collector tab of the carrier assembly with a positive current collector tab of an adjacent carrier assembly over an electrically isolating bar to form a folded tab pair.

34. The method according to claim 33 comprising placing a compression bar over each of the folded tab pairs for compressing and maintaining electrical contact between the positive and negative current collector tabs in each of the folded tab pairs.

35. The method according to claim 34 wherein the compression bars are made of thermally conductive material.

36. The method according to claim 35 comprising placing at least one thermal gap pad underneath the cooling plate and against the compression bars so as to transfer heat from the compression bars to the cooling plate.

37. The method according to claim 32 comprising placing caps over adjacent terminal ends of the pipes of adjacent carrier assemblies so as to connect the pipes in series.

38. A cell carrier for a battery cell, the cell carrier comprising:
  a thermally conductive backing plate for the battery cell and a frame integrally formed therewith, wherein the backing plate comprises opposing first and second side edges and opposing top and bottom edges, and wherein the frame comprises a liquid coolant-receiving channel extending adjacent to the first side edge, the bottom edge and the second side edge of the backing plate;
  a heat spreader sheet positioned over the backing plate, wherein the battery cell is disposed between the heat spreader sheet and the backing plate; and
  a compressible foam sheet adhered to the heat spreader sheet.

39. The cell carrier according to claim 38 wherein the compressible foam sheet is adapted to provide compression to attach the battery cell to the backing plate.

40. The cell carrier according to claim 38 comprising a thermally isolating sheet disposed in front of the foam sheet.

41. The cell carrier according to claim 40 wherein the thermally isolating sheet comprises a ceramic sheet.

42. The cell carrier according to claim 38 wherein the heat spreader sheet comprises a flexible graphite sheet.

43. The cell carrier according to claim 38 wherein the heat spreader sheet extends to and contacts the frame.

44. The cell carrier according to claim 38 wherein the frame comprises a pipe, the pipe having a bore for receiving the liquid coolant.

45. The cell carrier according to claim 44 wherein the pipe is formed of stainless steel and/or copper.

46. The cell carrier according to claim 38 wherein the backing plate and the frame are formed of aluminum.

* * * * *